US010391856B2

(12) United States Patent
Glickman

(10) Patent No.: US 10,391,856 B2
(45) Date of Patent: Aug. 27, 2019

(54) AIR DEFLECTOR WITH IMPROVED DRAINAGE

(71) Applicant: FORD GLOBAL TECHNOLOGIES, LLC, Dearborn, MI (US)

(72) Inventor: David Brian Glickman, Southfield, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 34 days.

(21) Appl. No.: 15/631,661

(22) Filed: Jun. 23, 2017

(65) Prior Publication Data
US 2018/0370347 A1 Dec. 27, 2018

(51) Int. Cl.
B60K 11/00 (2006.01)
B60K 11/08 (2006.01)
(Continued)

(52) U.S. Cl.
CPC .............. B60K 11/08 (2013.01); B60H 1/30 (2013.01); F01P 11/10 (2013.01); B60H 1/26 (2013.01); B60K 13/02 (2013.01)

(58) Field of Classification Search
CPC ....... B60K 11/08; B60K 11/085; B60K 11/06; B60K 11/00; B60K 13/02; B60K 13/06; B60K 13/00; B60H 1/30; B60H 1/26; B60H 1/24; B60H 1/242; F01P 11/10; B62D 35/005; B60R 19/52; B60R 2019/486; B60R 2019/525
See application file for complete search history.

(56) References Cited

U.S. PATENT DOCUMENTS 4,646,864 A * 3/1987 Racchi .................. B60K 11/08
180/69.22
4,678,118 A * 7/1987 Fukami .............. B60H 1/00492
180/903
(Continued)

FOREIGN PATENT DOCUMENTS

DE 102007002679 A1 7/2008
DE 202016105516 U1 10/2016
(Continued)

OTHER PUBLICATIONS

English Machine Translation of JP5910561B2.
(Continued)

Primary Examiner — James M Dolak
(74) Attorney, Agent, or Firm — Jason Rogers; Vichit Chea; King & Schickli PLLC

(57) ABSTRACT

An air deflector for a vehicle includes a pair of side air deflectors joined by an intermediate air deflector, and one or more drainage apertures offset from a sealed outboard corner of each of the pair of side air deflectors. The air deflector further includes one or more draining surfaces adapted to promote movement of liquids and solids to the one or more drainage apertures. The one or more drainage apertures may be defined by a non-planar margin defined in the intermediate air deflector member and/or the pair of side air deflectors. The one or more draining surfaces include a plurality of crowned and sloped surfaces adapted for directing movement of liquids and solids to the one or more drainage apertures.

3 Claims, 5 Drawing Sheets

(51) Int. Cl.
  *F01P 11/10*  (2006.01)
  *B60H 1/30*  (2006.01)
  *B60H 1/26*  (2006.01)
  *B60K 13/02*  (2006.01)

(56) References Cited

U.S. PATENT DOCUMENTS

| | | | | |
|---|---|---|---|---|
| 5,022,479 | A * | 6/1991 | Kiser | B60K 13/06 |
| | | | | 180/68.3 |
| 5,860,685 | A * | 1/1999 | Horney | B60K 13/02 |
| | | | | 180/68.1 |
| 6,578,650 | B2 | 6/2003 | Ozawa et al. | |
| 6,622,807 | B2 * | 9/2003 | Preiss | B62D 35/005 |
| | | | | 165/44 |
| 7,717,204 | B2 * | 5/2010 | Kondou | B60R 19/52 |
| | | | | 180/68.1 |
| 8,100,209 | B2 * | 1/2012 | Goldsberry | B60K 13/02 |
| | | | | 180/68.1 |
| 8,127,878 | B2 * | 3/2012 | Teraguchi | B60K 11/08 |
| | | | | 180/68.1 |
| 8,408,344 | B2 | 4/2013 | Williams et al. | |
| 8,528,679 | B2 * | 9/2013 | Stuckey | B60K 13/02 |
| | | | | 180/68.3 |
| 8,998,293 | B2 * | 4/2015 | Glickman | B62D 35/005 |
| | | | | 180/68.1 |
| 9,150,096 | B2 | 10/2015 | Takanaga et al. | |
| 9,327,780 | B1 * | 5/2016 | Bird | B60R 19/023 |
| 9,636,996 | B1 * | 5/2017 | Glickman | B60K 11/08 |
| 9,770,975 | B2 * | 9/2017 | Sokol | B60K 11/085 |
| 10,096,847 | B2 * | 10/2018 | Mito | B60K 13/02 |
| 10,266,212 | B2 * | 4/2019 | Overgaard | B60K 11/08 |
| 10,286,776 | B2 * | 5/2019 | Hammer | B60K 11/08 |
| 2009/0188100 | A1 | 7/2009 | Durney et al. | |
| 2017/0101001 | A1 | 4/2017 | Glickman | |

FOREIGN PATENT DOCUMENTS

| | | |
|---|---|---|
| EP | 1847446 B1 | 10/2008 |
| EP | 1998090 A2 | 12/2008 |
| JP | 5910561 B2 | 4/2016 |
| WO | 2014111211 A2 | 7/2014 |

OTHER PUBLICATIONS

English Machine Translation of DE202016105516U1.
English Machine Translation of DE102007002679A1.
English Machine Translation of WO2014111211A2.

* cited by examiner

AIR DEFLECTOR WITH IMPROVED DRAINAGE

TECHNICAL FIELD

This disclosure relates generally to airflow deflectors. More particularly, the disclosure relates to an air deflector for a vehicle, including a plurality of features and surfaces adapted to provide improved drainage.

BACKGROUND

Air deflectors such as side air deflectors designed for use at the interface of a vehicle air intake and cooling pack (radiator, fan, etc.) are typically slotted or disconnected at the corners. This promotes fit and drainage, and further advantageously reduces imposition of potentially excessive forces by the air deflector on the cooling pack, such as when an impact to the air deflector is received or forces imposed by relative movement of a vehicle chassis to elements of the vehicle engine compartment such as the cooling pack.

However, such slotting or disconnection at the corners reduces efficiency of airflow. Particularly for small-package and high-efficiency air cooling systems wherein it is necessary to maintain smoothness and integrity of airflow passing through the vehicle front air intake, through the deflector, and to the cooling pack, such unsealed air deflector corner portions allow unacceptable airflow leakage that negatively impacts efficiency of the airflow-based cooling.

Accordingly, a need in the art exists for vehicle air deflectors providing highly efficient airflow seals to meet modern cooling standards.

SUMMARY

In accordance with the purposes and benefits described herein, in one aspect of the present disclosure an air deflector is provided, comprising a pair of side air deflectors joined by an intermediate air deflector. The air deflector includes one or more drainage apertures offset from a sealed outboard corner of each of the pair of side air deflectors. The air deflector further includes one or more draining surfaces adapted to promote movement of liquids and solids to the one or more drainage apertures. In embodiments, the one or more drainage apertures are defined by a non-planar margin defined in the intermediate air deflector member and/or the pair of side air deflectors.

The one or more draining surfaces comprise a plurality of crowned and sloped surfaces interacting to efficiently move liquids and solids to the one or more drainage apertures. In embodiments, the plurality of crowned and sloped surfaces includes an intermediate air deflector crowned surface adapted for directing movement of liquids and solids to the one or more drainage apertures. The plurality of crowned and sloped surfaces may further include a crowned and sloped channel adapted for directing movement of liquids and solids from the sealed outboard corner to the one or more drainage apertures.

In embodiments, the pair of side air deflectors each further comprise a sloped surface including at least one channel for collecting and directing liquids and solids therethrough. The sloped surface in embodiments includes a first channel adapted for collecting and directing liquids and solids to the crowned and sloped channel and/or the one or more drainage apertures. In embodiments, the sloped surface further includes a second channel adapted for collecting and directing liquids and solids to an outboard end of the intermediate air deflector crowned surface.

In other aspects, an air deflector is provided, comprising a pair of side air deflectors each having a sealed outboard corner and joined by a crowned intermediate air deflector. One or more drainage apertures are disposed offset from the sealed outboard corners and defined by a non-planar margin defined in the crowned intermediate air deflector and/or the pair of side air deflectors. The air deflector includes draining surfaces comprising a plurality of crowned and sloped surfaces as described above.

In yet other aspects, an air deflector is provided, comprising a pair of side air deflectors each having a sealed outboard corner and joined by a crowned intermediate air deflector. One or more drainage apertures are provided in an offset position relative to the sealed outboard corners. The air deflector further includes one or more side air deflector draining surfaces as described above, adapted to promote movement of liquids and solids to the one or more drainage apertures. The draining surfaces may be substantially as described above. In embodiments, the one or more drainage apertures are defined by a non-planar margin defined in the crowned intermediate air deflector and/or the pair of side air deflectors.

In the following description, there are shown and described several preferred embodiments of the described air deflector. As it should be realized, the described air deflector is capable of other, different embodiments and its several details are capable of modification in various, obvious aspects all without departing from the device as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the described vehicle air deflector and together with the description serve to explain certain principles thereof. In the drawing figures.

Reference will now be made in detail to the present preferred embodiments of the vehicle air deflector as disclosed, examples of which are illustrated in the accompanying drawing figures.

DETAILED DESCRIPTION

Preliminarily, the presently disclosed air deflector is finds utility in a variety of vehicle types and airflow deflection systems, including the body-on-frame vehicle disclosed in U.S. Pat. No. 9,636,996 owned by the present Assignee, Ford Global Technologies, LLC. The present disclosure describes the air deflector in use in that type of vehicle.

However, the skilled artisan will readily appreciate that the described air deflector equally finds utility in any small-package/high-efficiency air cooling system wherein it is necessary to maintain smoothness and integrity of airflow, regardless of vehicle type or chassis/body interaction. Accordingly, the descriptions herein will not be taken as limiting in that regard.

Figure 1:
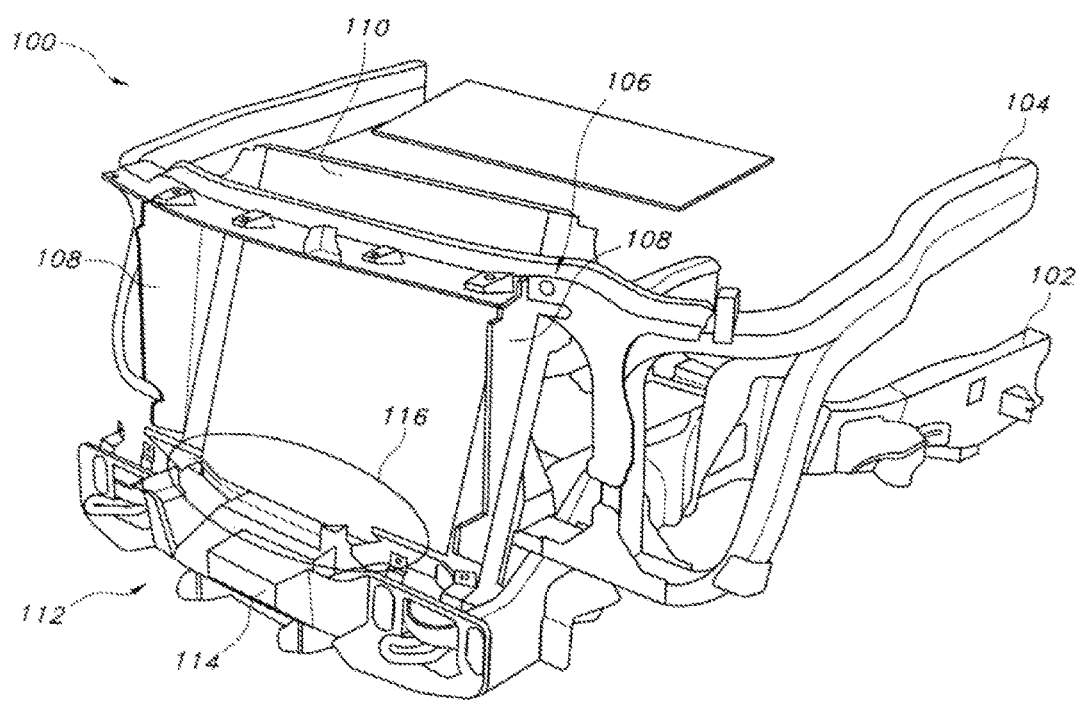
FIG. 1 depicts a front perspective view of a prior art fully decked vehicle chassis and body.

Reference is now made to FIG. 1 illustrating a prior art body-on-frame vehicle 100 including a chassis element 102 which supports the vehicle drivetrain (not shown) decked to a body frame 104 carrying/supporting a variety of body panels and vehicle elements (not shown). Modern body-on-frame vehicles 100 rely on multiple sealing parts in the vehicle front end and under the vehicle to direct cooling air to the vehicle cooling pack (radiator(s), condenser, oil cooler, transmission cooler, power steering cooler, etc.) and/or to underbody components requiring cooling, and present unique design challenges relating to installation of certain sealing components on the vehicle chassis 102 (referred to herein as the upper sealing system), installation of other sealing components on portions of the vehicle body frame 104 (referred to herein as the lower sealing system), and installation of still other sealing components which are required to bridge the lower and upper sealing systems, all while compensating for relative movement between the vehicle chassis 102 and the vehicle body frame 104 and any sealing components installed on those elements.

The vehicle 100 includes an upper airflow deflecting assembly 106 having at least side deflectors 108 which on vehicle assembly are attached to a grille opening reinforcement (not shown for convenience) and an upper airflow deflector 110. A lower airflow deflecting assembly 112 may include a front airscoop/deflector 114, which when the vehicle is assembled is disposed substantially behind a vehicle front bumper (not shown). In the fully decked position, i.e. on mounting of the body 104 to the chassis 102, an interface 116 is defined between the upper airflow deflecting assembly 106 and the lower airflow deflecting assembly 112. This interface must be sealed to provide a smooth, uninterrupted airflow through the upper and lower airflow deflecting assemblies 106/112. Such airflow deflecting assemblies also require suitable drainage to move collecting liquids and solids such as debris, gravel, and others out of the vehicle air intake(s). However, particularly in small-package and high-efficiency air cooling systems including side air deflectors 108 as described above, providing conventional drainage systems such as drain holes disposed at corner portions of the side air deflectors or side air deflectors that are disconnected from other elements of the airflow deflector assemblies can interfere with smooth airflow.

Figure 2:
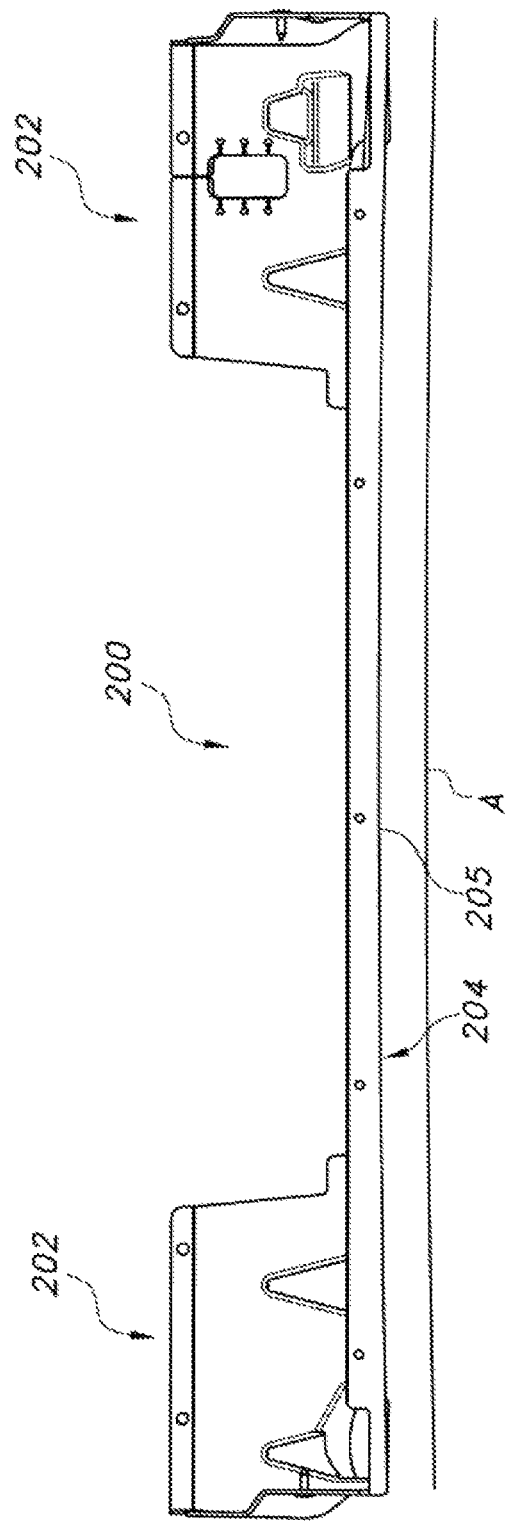
FIG. 2 shows an air deflector for a vehicle according to the present disclosure.

To solve this and other problems, with reference to FIG. 2 an air deflector 200 is provided, comprising a pair of side air deflectors 202 joined by an intermediate air deflector 204. The intermediate air deflector 204 includes a crowned surface 205 (see line A) adapted to move liquids and solids (particulates, debris, etc.) in a vehicle-outboard direction and towards a drainage portion of the air deflector 200 that will be described in greater detail below.

Figure 3:
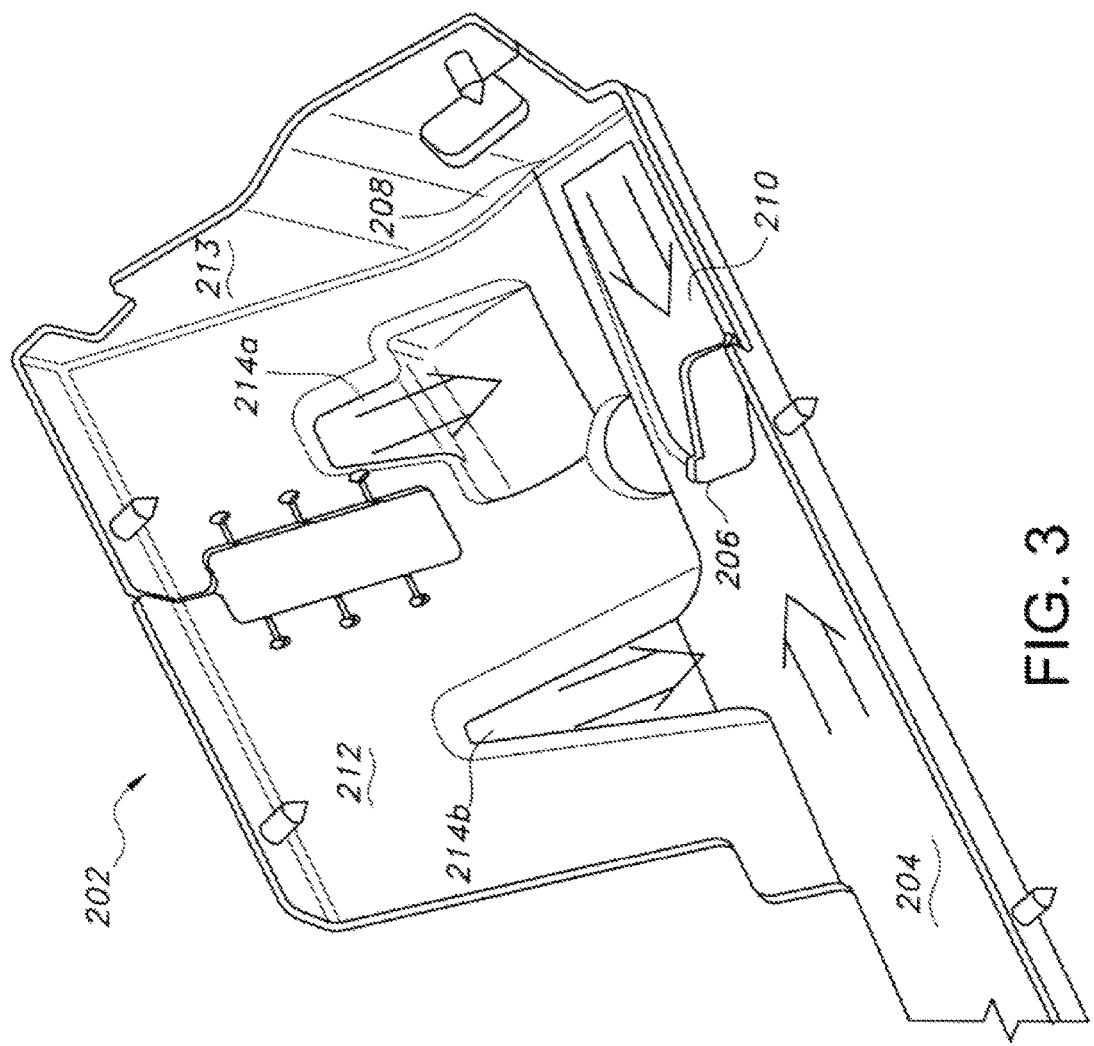
FIG. 3 shows a top perspective view of a side air deflector for the air deflector of FIG. 2, illustrating fluid/solid flow patterns promoted thereby.

FIG. 3 shows a one of the pair of side air deflectors 202 in greater detail. Each side air deflector 202 includes a plurality of draining surfaces (see arrows illustrating flow of liquids and/or solids) adapted to move liquids and solids to at least one drainage aperture 206. The depicted side air deflector 202 includes also a sealed corner portion 208 and a variety of crowned and sloped surfaces adapted to move liquids and solids to the at least one drainage aperture 206 as will now be described.

Figure 4:
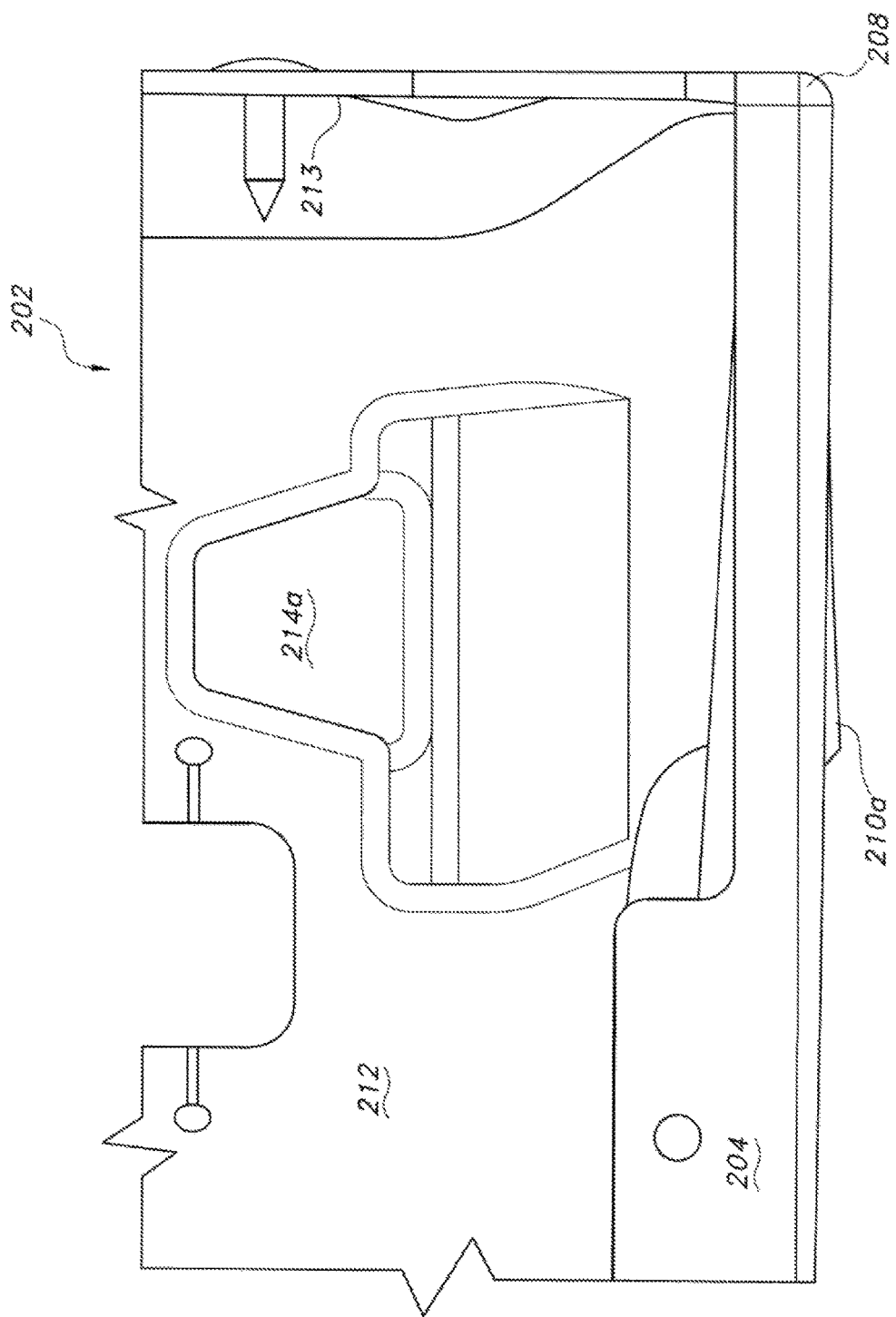
FIG. 4 shows a front view of the side air deflector of FIG. 3.

These crowned and sloped surfaces include a crowned and sloped channel 210 (see also FIG. 4 showing the crowned portion 210a of the crowned and sloped channel 210 in greater detail) which is adapted to move liquids and solids from the sealed corner portion 208 to the at least one drainage aperture 206.

The side air deflector 202 further includes a sloped surface 212 that includes one or more channels 214 adapted for collecting and directing liquids and solids therethrough. The sloped surface 212 is joined to a side wall 213 whereby the sealed corner portion 208 is provided. In the depicted embodiment, the sloped surface 212 includes a first channel 214a adapted for collecting and directing liquids and solids towards the crowned and sloped channel 210. The depicted sloped surface 212 may include a second channel 214b, adapted for collecting and directing liquids and solids towards a vehicle-outboard end of the intermediate air deflector 204.

Figure 5:
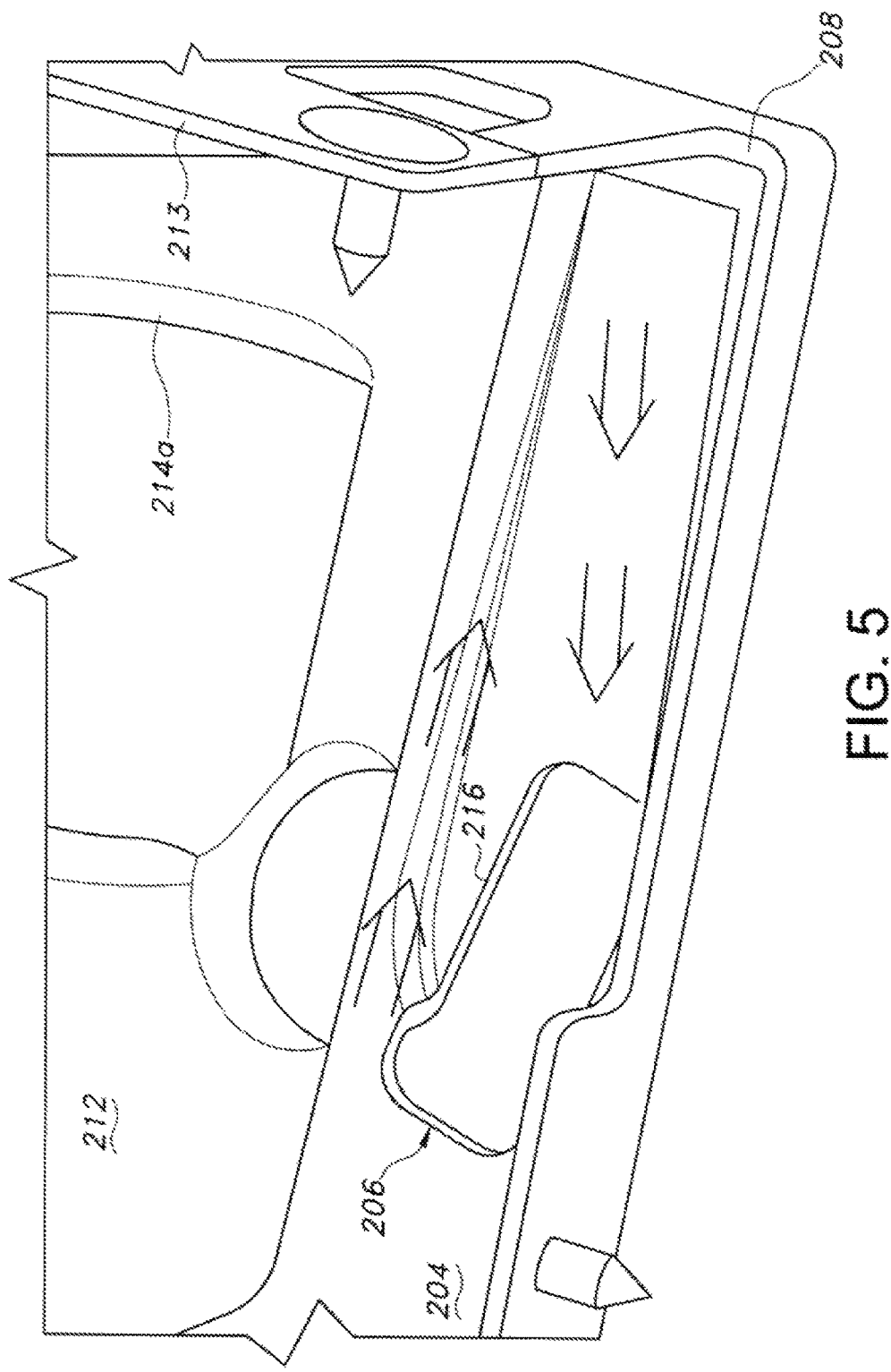
FIG. 5 is shows a top perspective view of a portion of the air deflector of FIG. 2 including a drainage aperture, illustrating fluid/solid flow patterns promoted thereby.

With reference to FIG. 5, each drainage aperture 206 is defined by a non-planar margin 216 provided by certain of the various crowned and sloped surfaces as described above. As will be appreciated, the three-dimensional configuration provided for the drainage aperture 206 by the non-planar margin 216 provides improved drainage while allowing a smaller two-dimensional footprint for the drainage aperture than would otherwise be required by using a planar drainage aperture.

In conjunction, as shown by the liquid/solid flow directions promoted by the various crowned and sloped surfaces as represented by arrows in FIGS. 3 and 5, fluid and solid flow is promoted from the intermediate air deflector 204 via crowned surface 205 in a vehicle-outboard direction and towards the drainage apertures 206. Likewise, by the crowned and sloped surfaces as described, fluid and solid flow is promoted towards a bottom end of the sloped surface 212 including towards the sealed corner portion 208, and therefrom by crowned and sloped channel 210 to the drainage aperture 206. By the three-dimensional shape provided to the drainage aperture 206 by non-planar margin 216, greater movement of fluids/solids is possible compared to a two-dimensional drainage aperture.

This is all accomplished while preserving the airflow integrity of sealed corner portions 208, compared to corner portions of conventional side air deflectors including slotted or disconnected areas to allow drainage. Because drainage is promoted to the offset drainage apertures 206 as described above, airflow at the sealed corner portions 208 experiences reduced turbulence, promoting a smoother airflow through an airflow deflecting assembly incorporating the described air deflector 200. In turn, by providing the sealed corner portions 208, an air deflector 200 providing an improved fit, improved dimensions, and indeed more complex shapes at a terminal end of the deflector is made possible.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An air deflector, comprising:
   one or more draining surfaces comprising a plurality of crowned and sloped surfaces including a crowned and sloped channel disposed to promote movement of liquids and solids to one or more drainage apertures; and
   a pair of side air deflectors joined by an intermediate air deflector having a crowned surface for directing movement of liquids and solids to vehicle-outboard ends of the intermediate air deflector;
   the pair of side air deflectors each comprising a sloped surface including a first channel to collect and direct liquids and solids to one or both of the crowned and sloped channel and the one or more drainage apertures and a second channel to collect and direct liquids and solids to the vehicle-outboard end of the intermediate air deflector;
   the one or more drainage apertures each being defined by a non-planar margin defined in one or both of the intermediate air deflector and the pair of side air deflectors, the one or more drainage apertures further being offset from a sealed outboard corner of each of the pair of side air deflectors.

2. An air deflector, comprising:
   a pair of side air deflectors each having a sealed outboard corner and joined by a crowned intermediate air deflector, the pair of side air deflectors each including:
      one or more end member draining surfaces comprising a crowned sloped channel to direct movement of liquids and solids to one or more drainage apertures and another crowned sloped channel to direct movement of liquids and solids from the sealed outboard corner to the one or more drainage apertures; and
      a sloped surface including a first channel to collect and direct liquids and solids to one or both of the crowned sloped channels and the one or more drainage apertures and a second channel to collect and direct liquids and solids to a side air deflector outboard end;
   the one or more drainage apertures each being offset from the sealed outboard corners and defined by a non-planar margin defined in one or both of the crowned intermediate air deflector and the pair of side air deflectors.

3. An air deflector, comprising:
   a pair of side air deflectors joined by a crowned intermediate air deflector, the pair of side air deflectors each comprising:
      a sealed outboard corner and a crowned sloped channel to direct movement of liquids and solids from the sealed outboard corner to one or more drainage apertures;
      a sloped surface including a first channel to collect and direct liquids and solids to one or both of the crowned sloped surface and the one or more drainage apertures and a second channel to collect and direct liquids and solids to an outboard end of the crowned intermediate air deflector; and
      one or more side air deflector draining surfaces to promote movement of liquids and solids to the one or more drainage apertures;
   the one or more drainage apertures each having a non-planar margin offset from the sealed outboard corners and defined in one or both of the crowned intermediate air deflector and the pair of side air deflectors.

* * * * *